United States Patent [19]

Boulain

[11] 3,956,442
[45] May 11, 1976

[54] PROCESS OF CONTINUOUS FABRICATION OF ELASTOMER OR PLASTOMER TUBES FROM AQUEOUS DISPERSIONS

[76] Inventor: Robert Georges Pierre Boulain, 1, Avenue Gabrielle, 94100 Saint-Maur, France

[22] Filed: May 29, 1974

[21] Appl. No.: 474,461

[52] U.S. Cl. .................................. 264/95; 260/767; 264/178 R; 264/184; 264/201; 264/204; 264/209; 264/236; 425/72 R
[51] Int. Cl.² ...................... B29H 7/14; B29H 15/00
[58] Field of Search ............ 264/95, 209, 236, 202, 264/204, 184, 207, 210 R, 347, 188, 218, 178 R, 201; 425/72, 326 R, 378; 260/767, 720, 819

[56] References Cited
UNITED STATES PATENTS
2,737,437    3/1956    Bechtold ............................ 264/218

OTHER PUBLICATIONS
Revertex Limited Tech. Bulletin (Gen. TB 23), Temple Fields, Essex, Jan. 1971, p. 1–3.

Primary Examiner—Jeffery R. Thurlow
Attorney, Agent, or Firm—Beveridge, DeGrandi, Kline & Lunsford

[57] ABSTRACT

Disclosed is a process for fabrication of elastomer or plastomer tubes from sensitized aqueous dispersions wherein the tube is extruded through a shaping apparatus. Heated air is discharged into the tube as it is extruded, with the heated air flowing axially through the tube to vaporize and remove serum exuded into the tube as the gelling process continues. The tube, having the heated air flowing therethrough may be passed through a washing vat to remove serum from its external surface.

9 Claims, 1 Drawing Figure

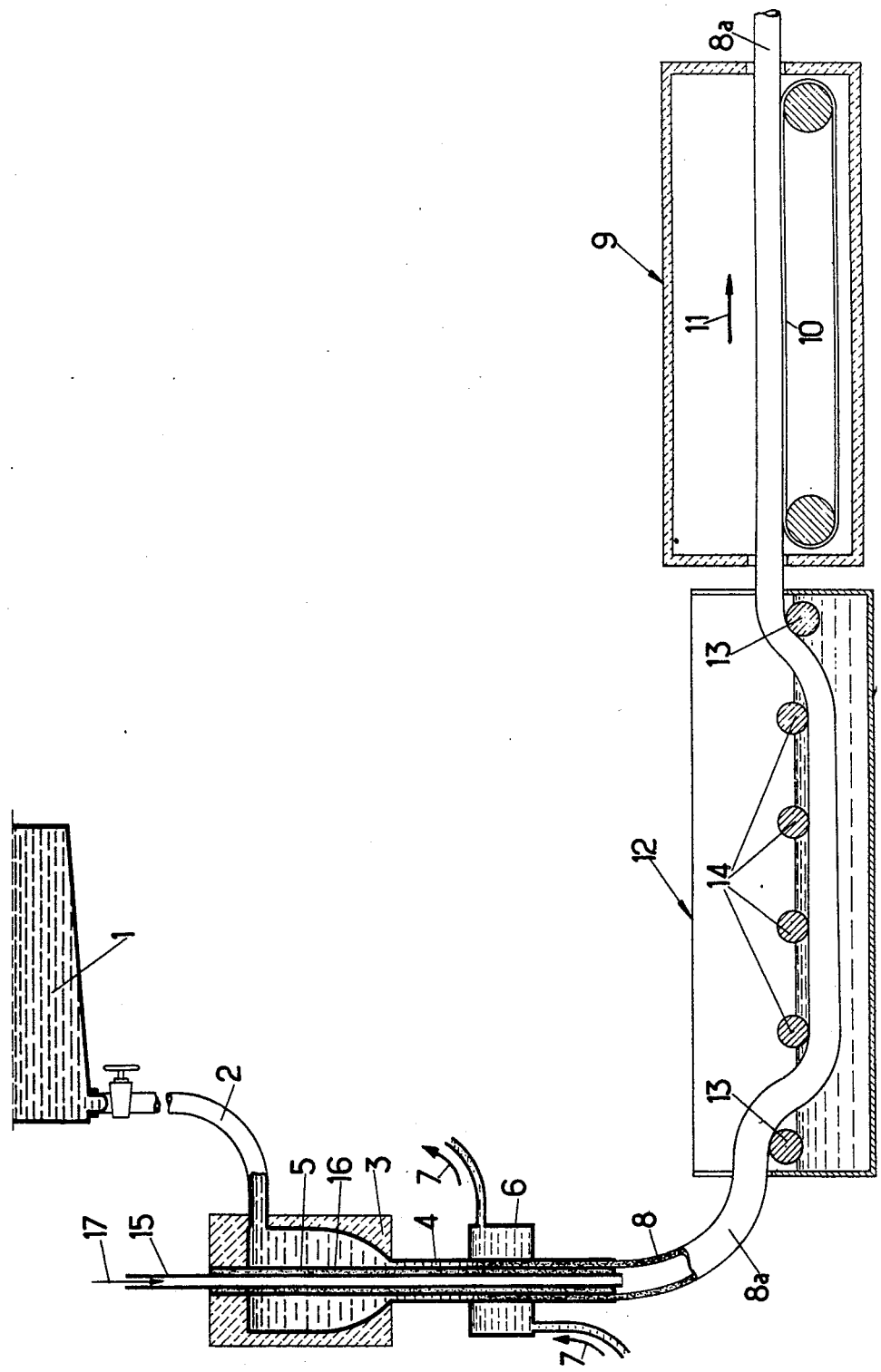

PROCESS OF CONTINUOUS FABRICATION OF ELASTOMER OR PLASTOMER TUBES FROM AQUEOUS DISPERSIONS

BACKGROUND OF THE INVENTION

1. Field of the Invention

This invention relates to processes of fabrication of elastomer or plastomer tubes, in particular surgical tubes, by extrusion of aqueous dispersions of particles made sensitive to heat.

2. Description of the Prior Art

Processes for the fabrication of elastomer and plastomer tubes by extrusion of obvious dispersions are known, one example being those processes developed by the English company Revertex Limited and known under the name of "Revultex processes." Unfortunately, these processes cannot be transformed into continuous extrusion processes, because the aqueous serum which is exuded from the wall of the tube during gelling, during shrinking of this gel, both on the outside face and inside face of this wall, can be eliminated by washing only by permitting the wash water easily to penetrate on the inside of the tube through the front end of this tube, and possibly through its back end after prior cutting of said tube at the exit of the extruder, i.e., after its passage in a chamber known as the "hot chamber" through which pass a tube and a central coaxial glass core, forming a shaping unit of said elastomer tube.

Further, the washing time of sections of tubing is generally very high, although excessive washing has a tendency to take away antioxidizing elements which are incorporated in the original material and which are necessary to obtain products free of defects. This washing period can vary from four hours for thin tubes to twenty-four hours, for example, in the case of tubes 3 mm thick.

Further, in the case of thin tubes, the Revultex process provides for the passage of the elastomer tube for about five minutes in a bath containing a weak solution of formic or acetic acid to increase the density and mechanical resistance of the gel making up the tube wall.

Finally, before final drying, the Revultex process provides for the passage of the elastomer tube for about six minutes in a chlorination bath with possible circulation of a chlorinating solution inside the elastomer tube.

To make such a process continuous, it has been proposed to take the extruded tube directly by a horizontal conveyor belt into a drying tunnel, without intermediate rinsing and chlorination treatments, by sending compressed cold air into the elastomer tube closed at its front end, by means of a glass tube replacing the shaping core, to prevent sagging of the tube by gravity during the horizontal travel intended to bring it to said drying tunnel.

However, in such a process, the aqueous serum exuded toward the inside of the tube, tends by gravity to condense in the lower part of this tube which is in contact with said conveyor belt, and consequently, at the same time of drying inside said tunnel, which is brought to a sufficient temperature to perfect cohesion and give the tube the desirable density and mechanical resistance, there is a heterogeneity in the physical structure of the tube at the site where the serum gathers, in relation to the rest of the tube wall.

SUMMARY OF THE INVENTION

The present invention overcomes these drawbacks of the prior art and has for its object a novel process making it possible, in most cases, to remove from the inside of the tube almost all of the serum which is exuded as the gelling processes continues and during the progressive shrinking of the wall of this tube.

Removal of the serum is obtained by causing to circulate inside the tube open at its front end, a current of hot air able to create a difference in vapor tension between the two respective faces of the wall of said tube in contact with the air or possibly with a washing bath going through this tube.

However, such a hot air injection requires the providing of an additional tube also going through the supply tank of the aqueous dispersion of elastomer, and the chamber, known as the hot chamber, through which pass two concentric tubes constituting the device for shaping the wall of the tube, and further requires a suitable thermal insulation of this additional tube in relation to the inside shaping tube. This additional tube descends approximately to the same level as the two shaping tubes to avoid too fast a gelling of the tube wall before the tube has left the shaping device.

The hot air current injected by means of this third tube then causes a gradual shrinking of the tube wall and a gradual reduction of its diameter, while the serum exuded in an increasing amount toward the inside of the tube is continuously removed by this hot air current in vapor state, assuring a very effective internal cleaning of the tube during fabrication.

Starting from the time when the tube is supported by a conveyor belt, it goes through a drying tunnel which assures evaporation of the aqueous serum exuded in a small amount toward the outside of the wall of said tube.

It can be seen that the hot air current prevents an internal condensation of water in the lower part of the tube housed in the vicinity of the conveyor belt, and therefore prevents any heterogenity of physical structure in the wall of the tube which can then be cut in desired lengths, at the exit of the tunnel for drying and vulcanization or reticulation.

Optionally, it is possible to provide, in certain cases, passage of the tube in an immersion vat upstream from the drying tunnel.

Such an immersion vat can comprise particularly the use of hot water at a temperature between 30° and 70°C and preferably on the order of 60°C, which results in causing the tube, still in the moist get state, to undergo a considerable contraction known as syneresis, and which makes it possible to get rid of almost all the serum contained in the gel both inside and outside of the tube. The serum exuded outward is diluted in the surrounding water, while the serum exuded toward the inside passes into the vapor state as soon as it reaches the inside face of the wall of the tube.

However, since the temperature of the hot air passing on the inside of this tube is normally of the order of 30 to 60°C and normally does not exceed this temperature except in the manufacture of thin tubes of small diameter, and since the circulation of this hot air assures a constant renewal of the evaporation surface, with the creation of a continuous low pressure at the interface between the gel and hot air current, there occurs, on the inside of the porosities presented by the gel before its final stabilization, a movement of serum toward the inside of the tube and a gradual drying of this tube on the inside.

It can be stated that, at the interface made up of the outside wall of the tube in contact with the surrounding water of the immersion bath, the water vapor tension is practically zero and that almost all of the serum which is exuded during gelling is carried off in the form of water vapor by said hot air current moving toward the front end of the tube. However, a time comes when this ascending circulation slows down and even becomes impossible when the gel is almost in its final stabilization state. The drying obtained by the inside hot air current can then be considered as having reached its maximum yield. At this moment, the tube, leaving the immersion vat, passes into the drying tunnel where it is carried by the conveyor belt, and where the outside face of its wall finishes drying and also reaches its final stabilized state. The tube is then vulcanized or reticulated, either by hot air or by any other known technique.

The main advantage of this new technique resides in the fact that it makes it possible to dry almost completely considerable wall thicknesses, if adequate passage time in said immersion vat is provided, a time which depends on the thickness of the wall.

As a variant to the use of such a hot water vat, it is also possible to use a coagulation vat filled with alchohol at ambient temperature, which mixes with the aqueous elements, separating the elastomer or plastomer particles by forming an azeotrope having a boiling point of the order of 78°C for ethyl alcohol and of the order of 64.5°C for methyl alcohol. Such an immersion in alcohol thereby causes an increased shrinking of the tube wall and an almost complete explusion of the serum that it contains. Actually, when an alcohol vat is used, the difference in vapor tension between the two faces of the tube is further increased by the fact of the lower boiling point of the water-alcohol azeotrope that is formed in the porosities of the gel. Use of such an alcohol vat therefore makes it possible to increase notably the drying speed by supplying a firmer and more regular gel, ultimately leading to the obtaining of a more impermeable tube.

Finally, as indicated above, in the case of thinner tubes, for example 2/10 to 12/10 millimeter thick, it is possible to eliminate any hot water or alcohol immersion vat. The principle of a circulation of hot air inside the tube is used, but then the tube coming from the extruder is received directly into the traditional-type drying tunnel where reticulation or vulcanization of the product used occurs. Actually, in the case of these slight thicknesses, during syneresis, the network of channels filled with serum that goes through the wall of the tube, is of insufficient length to permit trapping of the serum in sufficient amounts to substantially harm the further impermeability of the tube wall.

BRIEF DESCRIPTION OF THE DRAWINGS

The characteristics of the present invention will be better understood from a reading of the following description of an embodiment of the invention, given by way of non-limiting example and described with reference to the accompanying drawing whose single FIGURE schematically represents the different phases.

DESCRIPTION OF THE PREFERRED EMBODIMENTS

In the single FIGURE of the drawings, there is illustrated a storage container 1 of a sensitized dispersion, supplying, by a pipe 2, the upper part 3 of an extruder making it possible to introduce this dispersion between two concentric tubes 4 and 5 extending on the inside of a chamber 6, known as the hot chamber, and comprising a circulation, along arrows 7, of water kept at a temperature between 50° and 60°C. Alternatively, any other equivalent effective means such as an electrically heated collar may be provided for heating the latex to a temperature at least equal to 50°C, and preferably able to reach 75°C for certain types of latex, to assure gelling of this latex regardless of the extrusion speed achieved by the process.

A little below chamber 6 the two concentric tubes 4 and 5 stop and the tube formed by gelling of the dispersion leaves the space between said tubes 4 and 5. This tube is shown in section and indicated by the reference numeral 8 at the exit of said tubes 4 and 5, and not in section and indicated by the numeral 8a therebelow and, to the exit of a drying tunnel 9, where, as said above, the material constituting the tube possibly undergoes a reticulation or vulcanization. A conveyor belt 10 carriies tube 8a forward in the direction of arrow 11.

In the variants comprising an immersion vat, tunnel 9 is preceded by such a vat 12, inside of which tube 8a is guided by rollers 13 and 14, or by equivalent means. Depending on the case, the immersion vat is filled with hot water or has hot water circulated therethrough at a temperature within the range of about 50° and 70°C. Alternatively, the vat may be filled with alcohol able to generate, in the thickness of the wall of tube 8a, an azeotrope promoting the evacuation of serum from inside said tube walls. This evacuation is obtained, as already said, by injecting hot air by means of a third tube 15 coaxially within the two tubes 4 and 5, but thermally insulated in relation to the tube 5 by a layer of insulation material 16. This hot air, which is normally kept at a temperature of the order of 30° to 60°C, reaches tube 8a only at a point substantially equal to that of the lower part of said tubes 4 and 5. The hot air current moves in the direction of arrow 17 and comes out through the open front part of said tube.

It should be noted that injection of cold air, which has been considered as a means to permit continuous fabrication, does not make it possible to achieve an effective drying on the inside, nor to avoid the harmful effects due to an internal condensation of moisture on the lower part of a tube moving horizontally.

It is understood that various changes, improvements or additions can be made in the embodiments of the process just described, and certain phases of this process can be replaced by equivalent phases, without thereby alterating the general economy of the invention.

Particularly, in the case of immersion in a methyl alcohol bath, it is possible to incorporate a certain percentage of calcium nitrate and/or chloride, able to increase still more the shrinking of the get at the time of immersion.

It should also be noted that the delivery and pressure of said air current are selected as a function of the diameter and thickness of the tubes to be fabricated, and possibly to avoid a flattening of these tubes under the action of the pressure of the immersion liquid.

What is claimed is:

1. In the process of fabrication of elastomer or plastomer tubes from a sensitized aqueous disperson, wherein the dispersion is passed from a supply chamber of an extruder through a shaping device in the form of two concentric tubular conduits extending downwardly from said supply chamber with the dispersion passing between said tubular conduits and means below said supply chamber supplying heat to the dispersion passing between said tubular conduits to initiate gelling thereof prior to its being discharged from said shaping device, the improvement comprising providing a third tubular conduit passing through said supply chamber and extending coaxially through and thermally insulated from said two concentric conduits and terminating at its lower end at substantially the same level as said two concentric conduits, and continuously supplying heated compressed air through said third conduit and into the partially gelled tube substantially as it is discharged from between said two concentric conduits, said heated compressed air being supplied at a rate to produce a flow of air through the partially gelled tube to accelerate the final gelling process and being heated to a temperature to promote evaporation of aqueous serum exuded from the inner surface of the tube being formed.

2. The process as defined in claim 1 wherein said heated air is discharged into said partially gelled tube at a temperature within the range of about 30° to 60°C and is permitted to flow axially therethrough.

3. The process as defined in claim 1 further comprising the steps of passing said partially gelled tube through an immersion vat containing wash water outside said partially gelled tube, and maintaining the temperature of said wash water within the range of about 30° to 70°C.

4. The process according to claim 3 further comprising the step of passing said partially gelled tube from said vat through a drying tunnel to assure vulcanization or reticulation of the elastomer or plastomer constituting the tubes.

5. The process as defined in claim 3 further comprising the steps of flowing said wash water at a temperature within the range of about 30° to 70°C through said vat and external of said tube.

6. The process as defined in claim 1 further comprising the steps of passing partially gelled tube through an immersion vat containing methyl alcohol or ethyl alcohol at ambient temperature.

7. A process as defined in claim 6 further comprising subsequently passing said tube through a drying tunnel to assure vulcanization or reticulation of the elastomer or plastomer consituting the tubes.

8. The process according to claim 1 wherein the heat necessary to initiate gelling of said dispersions is provided by a heating collar surrounding said shaping conduits and capable of heating said dispersions to a temperature as high as about 75°C.

9. The process as defined in claim 1 wherein said tubes are of small diameter and of thin wall construction and wherein said heated air is discharged into said tubes at a temperature greater than 60°C and permitted to flow therethrough.

* * * * *